US009348335B2

(12) United States Patent
Gama-Valdez et al.

(10) Patent No.: US 9,348,335 B2
(45) Date of Patent: May 24, 2016

(54) LANDING GEAR FORCE AND MOMENT DISTRIBUTOR

(71) Applicants: AIRBUS OPERATIONS LIMITED, Bristol (GB); AIRBUS OPERATIONS SAS, Toulouse (FR)

(72) Inventors: Miguel Angel Gama-Valdez, Bristol (GB); Louis-Emmanuel Romana, Toulouse (FR); Andrea Damiani, Bristol (GB); Michael Richard Whincup, Bristol (GB)

(73) Assignee: Airbus Operations Limited, Bristol (GB)

( * ) Notice: Subject to any disclaimer, the term of this patent is extended or adjusted under 35 U.S.C. 154(b) by 0 days.

(21) Appl. No.: 14/443,252

(22) PCT Filed: Nov. 15, 2013

(86) PCT No.: PCT/GB2013/053013
§ 371 (c)(1),
(2) Date: May 15, 2015

(87) PCT Pub. No.: WO2014/076486
PCT Pub. Date: May 22, 2014

(65) Prior Publication Data
US 2015/0301531 A1    Oct. 22, 2015

(30) Foreign Application Priority Data
Nov. 16, 2012 (GB) .................................. 1220618.1

(51) Int. Cl.
*B64C 25/00* (2006.01)
*B64C 25/44* (2006.01)
(Continued)

(52) U.S. Cl.
CPC ............ *G05D 1/0083* (2013.01); *B60T 8/1703* (2013.01); *B60T 8/1766* (2013.01); *B64C 25/34* (2013.01); *B64C 25/405* (2013.01); *B64C 25/48* (2013.01); *G05D 1/0202* (2013.01); *B64C 25/00* (2013.01); *B64C 25/10* (2013.01); *B64C 25/18* (2013.01); *B64C 25/26* (2013.01); *B64C 2025/008* (2013.01); *Y02T 50/823* (2013.01)

(58) Field of Classification Search
CPC ........ B64C 25/00; B64C 25/10; B64C 25/18; B64C 25/26; B64C 25/34; B64C 25/48; B64C 25/408; B64C 2025/008; B60T 8/1703; B60T 8/1766; G05D 1/0083; G05D 1/0202; Y02T 50/823
USPC ...................................... 701/3, 16; 244/100 R
See application file for complete search history.

(56) References Cited

U.S. PATENT DOCUMENTS 4,078,845 A * 3/1978 Amberg ................. B60T 8/1703
244/111
4,180,223 A * 12/1979 Amberg ................. B60T 8/1703
244/111
(Continued)

FOREIGN PATENT DOCUMENTS

| EP | 1 864 878 | 12/2007 |
|---|---|---|
| EP | 2 439 604 | 4/2012 |
| GB | 2 411 934 | 9/2005 |

OTHER PUBLICATIONS

International Search Report for PCT/GB2013/053013 mailed Mar. 21, 2014, 4 pages.
(Continued)

*Primary Examiner* — Thomas Tarcza
*Assistant Examiner* — Tyler J Lee
(74) *Attorney, Agent, or Firm* — Nixon & Vanderhye P.C.

(57) ABSTRACT

A landing gear force and moment distributor system for an aircraft having a longitudinal axis aligned in a forward-aft direction, a vertical axis perpendicular to the longitudinal axis, and a landing gear including a pair of bogies arranged symmetrically about the longitudinal axis, each bogie having an actuator arranged to brake and/or drive one or more wheels. The force distribution system includes a distribution module arranged to: receive an input demand including a longitudinal force input demand corresponding to a desired braking or driving force along the longitudinal axis for the landing gear and a moment input demand corresponding to a desired moment about the vertical axis for the landing gear; and to use the received input demand to calculate an output command including, for each bogie, a longitudinal force output command corresponding to a braking or driving force along the longitudinal axis to be applied to the bogie.

15 Claims, 3 Drawing Sheets

(51) Int. Cl.
*G05D 1/00* (2006.01)
*B60T 8/17* (2006.01)
*B60T 8/1766* (2006.01)
*B64C 25/40* (2006.01)
*B64C 25/48* (2006.01)
*B64C 25/34* (2006.01)
*G05D 1/02* (2006.01)
*B64C 25/10* (2006.01)
*B64C 25/18* (2006.01)
*B64C 25/26* (2006.01)

(56) References Cited

U.S. PATENT DOCUMENTS

| | | | | |
|---|---|---|---|---|
| 4,482,961 | A * | 11/1984 | Kilner | G05D 1/0083 244/183 |
| 6,758,440 | B1 * | 7/2004 | Repp | B64F 1/02 244/110 C |
| 7,013,208 | B2 * | 3/2006 | Park | B60T 8/1703 188/181 T |
| 7,226,018 | B2 * | 6/2007 | Sullivan | B60L 7/26 244/111 |
| 8,517,303 | B2 * | 8/2013 | Dilmaghani | B64C 25/405 244/100 R |
| 8,584,989 | B2 * | 11/2013 | Lemay | G05D 1/0083 188/382 |
| 2006/0038068 | A1 * | 2/2006 | Sullivan | B60L 7/26 244/111 |
| 2009/0218440 | A1 | 9/2009 | Dilmaghani et al. | |
| 2009/0261197 | A1 * | 10/2009 | Cox | B64C 25/36 244/50 |
| 2012/0072057 | A1 * | 3/2012 | Lemay | G05D 1/0083 701/3 |

OTHER PUBLICATIONS

Written Opinion of the ISA for PCT/GB2013/053013 mailed Mar. 21, 2014, 5 pages.

* cited by examiner

LANDING GEAR FORCE AND MOMENT DISTRIBUTOR

RELATED APPLICATION

This application is the U.S. national phase of International Application No. PCT/GB2013/053013 filed 15 Nov. 2013, which designated the U.S. and claims priority to GB 1220618.1 filed 16 Nov. 2012, the entire contents of each of which are hereby incorporated by reference.

FIELD OF THE INVENTION

The present invention relates to a system for distributing force and moment demands between the actuated bogies of the landing gear of an aircraft.

BACKGROUND OF THE INVENTION

A typical aircraft has landing gear comprising a plurality of wheeled landing gear assemblies which support the aircraft when it is on the ground. The landing gear assemblies are used to control the movement of the aircraft during ground manoeuvres such as landing, taxiing and take off. A typical large jet-powered aircraft includes a steerable nose landing gear (NLG) assembly located towards the front of the fuselage and a plurality of main landing gear (MLG) assemblies (also known as bogies) located rearwards of the NLG assembly and distributed laterally about the aircraft longitudinal axis. The MLG assemblies typically each include one or more actuators which are operable to provide a braking force and/or driving force to decelerate and/or accelerate, respectively, the wheels of that MLG assembly.

The movement of such an aircraft on the ground, e.g. during ground taxi manoeuvres, is determined by control commands issued from the cockpit. To achieve these control commands, the landing gear is required to achieve a particular longitudinal force demand and yaw moment demand. The present invention is concerned with determining a driving or braking force to be applied to each MLG assembly in order to achieve those demands.

SUMMARY OF THE INVENTION

A first aspect of the invention provides a landing gear force and moment distributor system for an aircraft having a longitudinal axis aligned in a forward-aft direction, a vertical axis perpendicular to the longitudinal axis, and a landing gear assembly including a pair of bogies arranged symmetrically about the longitudinal axis, each bogie having an actuator arranged to brake and/or drive one or more wheels, the force distribution system comprising:

a distribution module arranged to: receive an input demand including a longitudinal force input demand corresponding to a desired braking or driving force along the longitudinal axis for the landing gear assembly and a moment input demand corresponding to a desired moment about the vertical axis for the landing gear assembly; and to use the received input demand to calculate an output command comprising, for each bogie, a longitudinal force output command corresponding to a braking or driving force along the longitudinal axis to be applied to said bogie to achieve the longitudinal force input demand, and a moment output command corresponding to a braking or driving force along the longitudinal axis to be applied to said bogie to achieve the moment input demand; and an error-based feedback loop module arranged to: calculate an error difference between the output command and the input demand; use the calculated error difference to calculate a corrected longitudinal force demand and corrected moment demand; and output the corrected longitudinal force input demand and corrected moment input demand to the distribution module to be received as the longitudinal force input demand and moment input demand, respectively, of the input demand.

In this way, the system can straightforwardly achieve the global landing gear longitudinal force and yaw moment demands by calculating and applying particular braking or driving forces at each bogie. The error-based feedback loop module ensures that the braking or driving forces at the bogies together correctly achieve the longitudinal force and yaw moment demands.

In preferred embodiments the error-based feedback loop module includes a first closed feedback loop arranged to calculate a first error difference between a sum of the plurality of longitudinal force output commands and the longitudinal force input demand; and a second closed feedback loop arranged to calculate a second error difference between a sum of the plurality of moment output commands and the moment input demand, and the error-based feedback loop module is arranged to use the first error difference to calculate the corrected force input demand and to use the second error difference to calculate the corrected moment input demand.

The distribution module is preferably arranged to calculate the output command such that the longitudinal force output command for each of the pair of bogies is the same. Such symmetric distribution ensures that the application of a longitudinal force output command cannot result in a resultant yaw moment being applied to the aircraft.

The distribution module is preferably arranged to calculate the output command such that the moment output command for one of the pair of bogies is equal in magnitude but opposite in direction to that of the other of the pair of bogies. Such anti-symmetric distribution ensures that the application of a moment output command cannot result in a resultant longitudinal force being applied to the aircraft. Thus, the longitudinal force output command and moment output command are completely uncoupled.

The distribution module may be arranged to calculate the output command by multiplying the received input command by a plurality of distribution parameters, each distribution parameter corresponding to a characteristic of the actuator of one of the pair of bogies. In this way, factors such as the types of actuator, or a failure or loss of performance in one of the actuators can be taken into account when calculating the output command. The distribution parameters may be runtime adjusted according to one or more of: operational scenarios, system layout, structural constraints, actuator type, actuator fitness and actuator availability.

The error-based feedback loop module may be arranged to apply a first control gain to the first error difference to calculate the corrected force input demand, and to apply a second control gain to the second error difference to calculate the corrected moment input demand. In this way, the relative values of the first and second control gains can be controlled in order to control the relative values of the corrected force input demand and corrected moment input demand.

The control gains may be runtime adjusted in accordance with one or more of: operational scenarios, system layout, structural constraints, actuator type, actuator fitness and actuator availability, in order that such factors can be taken into account when calculating the corrected force input demand and corrected moment input demand.

Preferably, the first and second control gains can be runtime adjusted to prioritise either the longitudinal force input demand or the moment input demand. That is, to accommodate scenarios in which it is not possible to achieve both the longitudinal force input demand and the moment input demand, the first and second control gains may be set so that either the moment input demand is achieved at the expense of the longitudinal force input demand, or vice versa.

Alternatively, the system may include a priority saturation module arranged to: receive the longitudinal force input demand and moment input demand; limit either the longitudinal force input demand or the moment input demand according to one or more runtime adjusted priority saturation values; and output the longitudinal force input demand and moment input demand to the distribution module. The priority saturation values may be tuned in accordance with one or more of: operational scenarios, system layout, structural constraints, actuator type, actuator fitness and actuator availability.

The system may include a dynamic saturation module arranged to: receive the output command from the distribution module; receive a plurality of runtime adjusted dynamic saturation values; and limit the output command according to the dynamic saturation values. Thus, the output command can be limited to ensure that, for example, no actuator is overloaded, based on runtime-derived information. Each of the dynamic saturation values may be dependent on one or more of: operational scenarios, system layout, structural constraints, actuator type, actuator fitness and actuator availability.

Alternatively, the system may include dynamic saturation module arranged to: receive the output command from the distribution module; receive a plurality of runtime adjusted dynamic saturation values; and limit the output command according to the dynamic saturation values, and wherein the priority saturation module is arranged to optimally redistribute a portion of each of the received longitudinal force input demand and the moment input demand that exceeds the dynamic saturation values. Thus, in the event that it is not possible to achieve the output command (e.g. because it would require an actuator to be overloaded), the input demands can be modified in order to provide an achievable output command.

The system may comprise a reconfiguration module arranged to receive reconfiguration parameters indicative of one or more of: an operational scenario, system layout, structural constraints, actuator type, actuator fitness, and actuator availability, and to output priority saturation values, dynamic saturation values, first and second control gains and/or distribution parameters based on those reconfiguration parameters in the event of a change in said one or more parameters, without disrupting its continuous operation. By receiving reconfiguration data the system awareness of various aircraft parameters affecting operation of the braking system may be increased. The braking system may, for example, adapt a braking operation in response to the reconfiguration parameters to maintain performance under different operating conditions, for example during failure modes.

In the foregoing and following description, the term longitudinal is used to refer to a direction along the forward-aft longitudinal axis, or roll axis, of the aircraft, and the term yaw is used to refer to a rotation about the vertical axis, or yaw axis, of the aircraft.

BRIEF DESCRIPTION OF THE DRAWINGS

Embodiments of the invention will now be described with reference to the accompanying drawings, in which.

DETAILED DESCRIPTION OF EMBODIMENT(S)

Figure 1A:
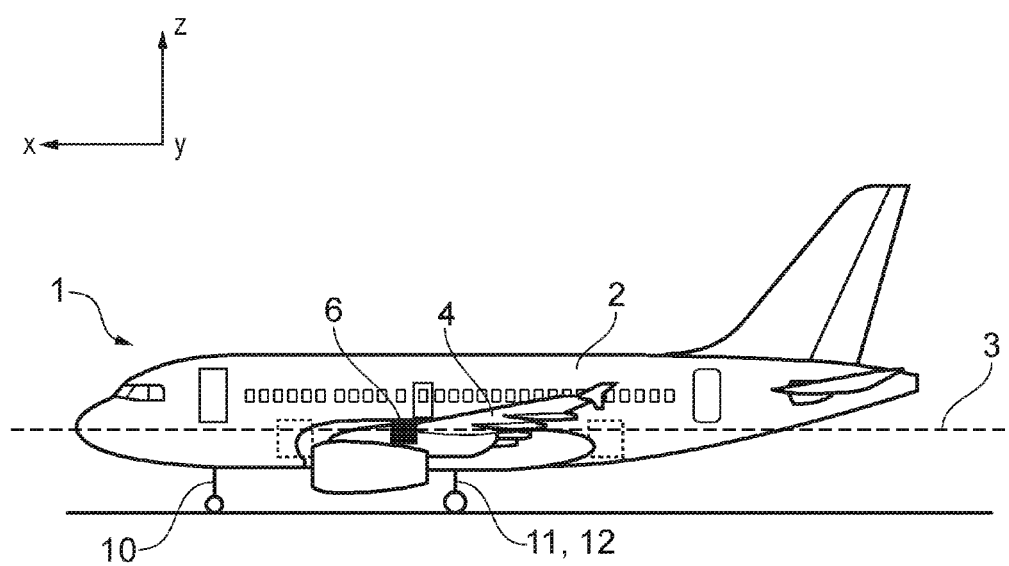
FIGS. 1a and 1b illustrate schematic side and plan views, respectively, of an aircraft.
Figure 1B:
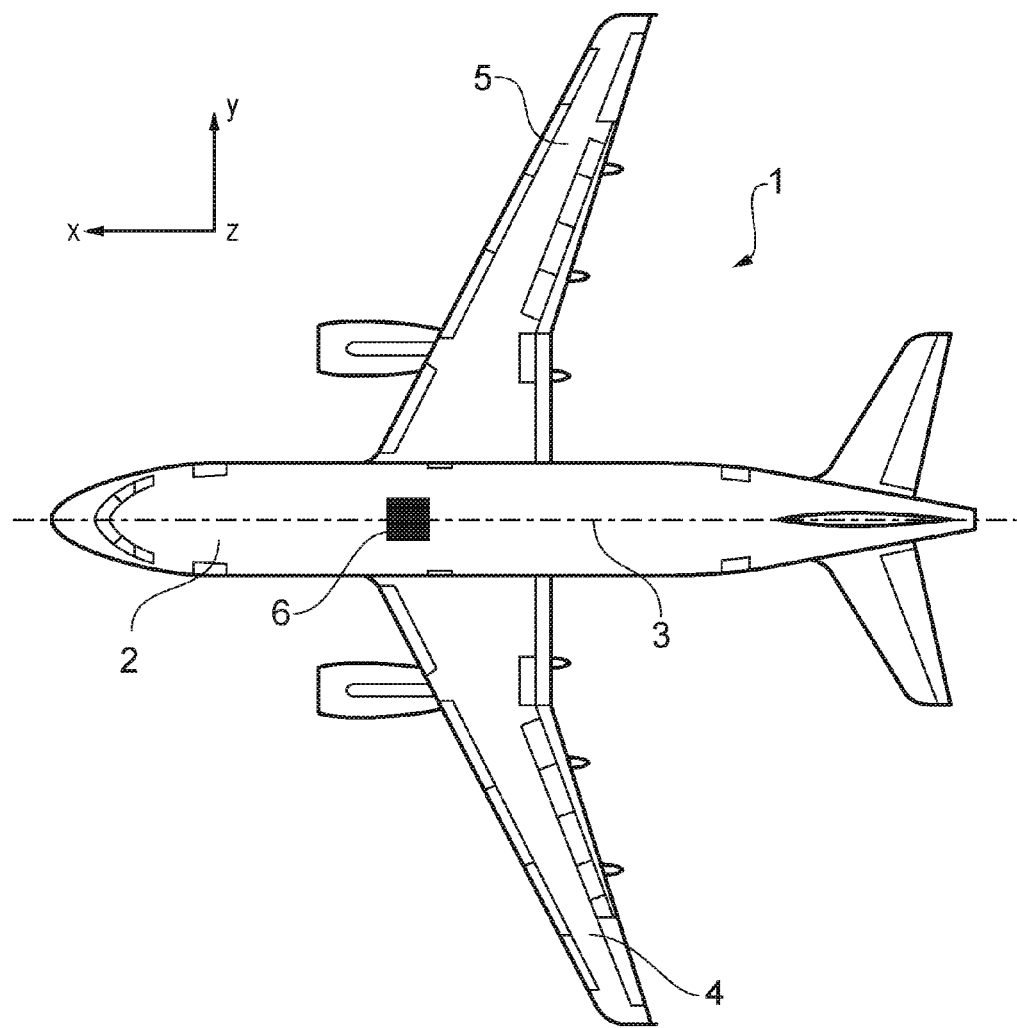

FIGS. 1a and 1b show an aircraft 1 having a fuselage 2 with a longitudinal axis 3 (also known as a roll axis) and wings 4, 5 extending outwardly from the fuselage. The aircraft 1 defines a set of axes with a longitudinal x direction parallel to the longitudinal axis 3 of the aircraft, a lateral y direction perpendicular to the x axis, and a vertical z direction perpendicular to the x and y axes. The aircraft 1 has a centre of gravity 6.

The aircraft has landing gear which supports the aircraft when it is on the ground and controls the movement of the aircraft during ground manoeuvres such as landing, taxiing and take off. The landing gear comprises a nose landing gear (NLG) assembly 10 forward of the centre of gravity 6, and a pair of port and starboard main landing gear (MLG) assemblies 11, 12 aft of the centre of gravity 6 and arranged either side of the longitudinal axis 3. In other embodiments, the aircraft may comprise one or more further MLG assemblies, typically arranged in pairs and located either side of the longitudinal axis 3. The landing gear is usually retracted when the aircraft 1 is in flight, and extended before landing.

The NLG assembly 10 has a pair of steering wheels which may be rotated by a steering actuator to steer the aircraft. The nose wheel angle is defined as the angle between the direction in which the steering wheels are facing (that is the direction in which the wheels roll in a direction perpendicular to the axis of rotation) and the longitudinal axis 3 of the aircraft 1. The nose wheel angle may be varied to control the direction of travel of the NLG assembly 10, thereby controlling the heading of the aircraft.

The MLG assemblies 11, 12 each comprise a 4-wheeled bogie (alternatively, a 6-wheeled bogie or bogie with any number of wheels may be suitable) with an actuator (not shown) capable of acting on one or more of the wheels to accelerate or decelerate the bogie. The actuator may comprise a brake actuator which applies a clamping force to a stack of carbon brake disks (stators and rotors) to transfer a braking torque to the one or more wheels, resulting in a longitudinal deceleration force being transferred to the bogie. Alternatively, or in addition, the actuator may comprise a motor operable to apply a driving force to the one or more wheels to result in application of a longitudinal acceleration force being transferred to the bogie.

The actuators of the MLG assemblies 11, 12 may be used to help steer the aircraft via differential braking, which is the intentional application of unbalanced braking forces either side of the aircraft centre line 3 to generate a net yaw moment to steer the aircraft. Differential braking may be achieved by applying different braking forces to each of the bogies of the MLG assemblies 11, 12.

Braking and steering operations may also be assisted by other systems, for example spoilers and other control surfaces and the aircraft's engines.

The aircraft 1 includes a cockpit system (not shown) for longitudinal control which is used to control deceleration or acceleration of the aircraft and which outputs a signal representative of a desired braking or driving force along the longitudinal x axis 3 that is to be achieved by the landing gear, i.e. a longitudinal force input demand, Fx*. The aircraft 1 also includes a cockpit system (not shown) for lateral control which is used to steer the aircraft and which outputs a signal representative of a desired moment about the vertical z axis that is to be achieved by the landing gear, i.e. a yaw moment input demand, $Mz^*$.

Figure 2:
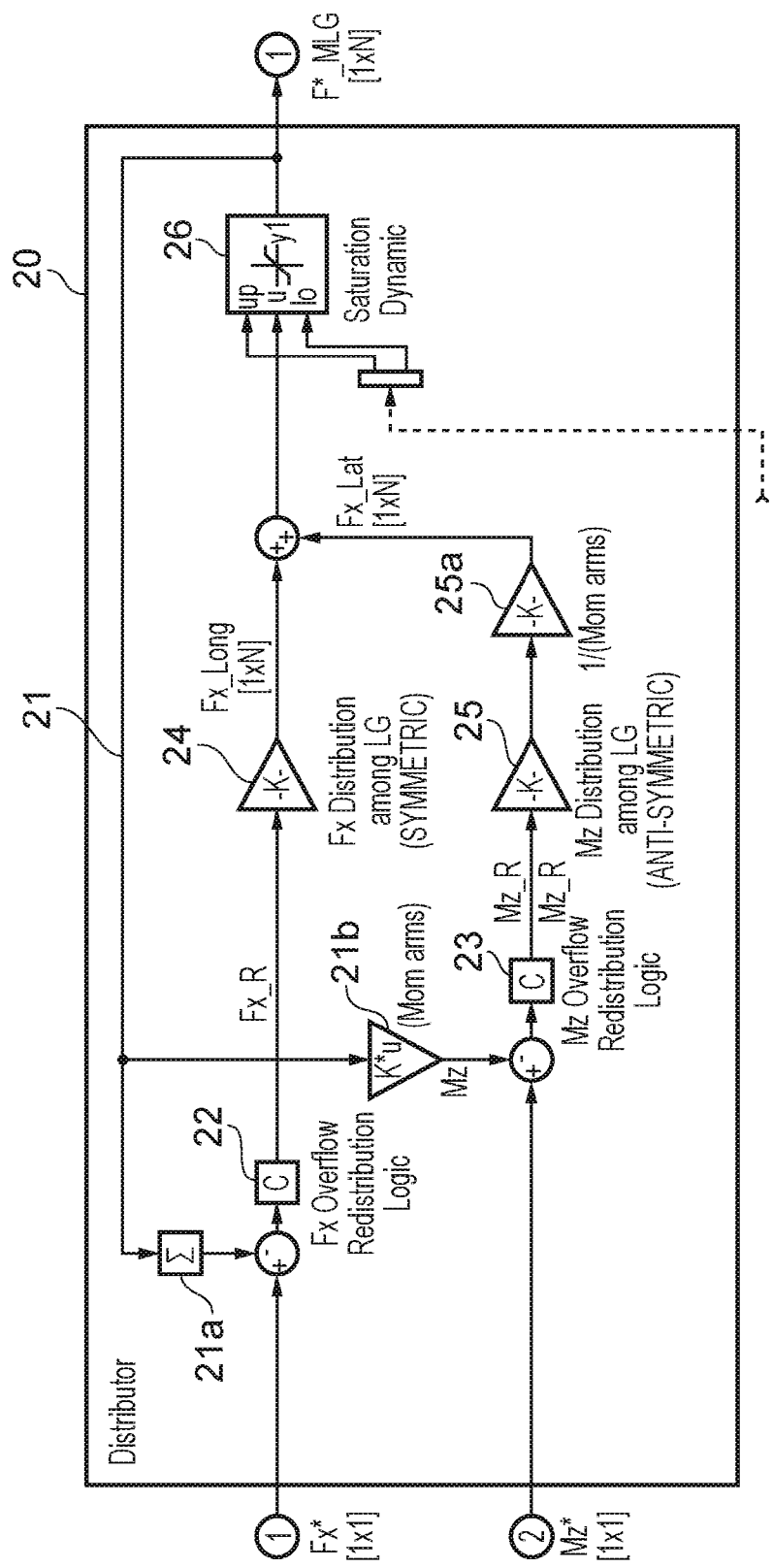
FIG. 2 illustrates a force and moment distribution system according to an embodiment of the invention.

FIG. 2 shows a force and moment distributor system 20 according to an embodiment of the invention which receives the longitudinal force input demand, $Fx^*$, and yaw moment input demand, $Mz^*$, and determines the braking and/or driving forces to be applied to each of the MLG assemblies 11, 12 in order to achieve those demands. The output of the system 20 is a vector (of size 1×N, where N represents the number of MLG assemblies, in this case two) of longitudinal force commands, $F^*\_MLG$, which comprises a longitudinal braking or driving force to be applied to each MLG assembly, respectively.

The system 20 includes a longitudinal force overflow redistribution logic module 22 having an error-based PI controller which receives the longitudinal force input demand, $Fx^*$, and, via a closed feedback loop 21, a scalar value representative of the vector of landing gear force commands, $F^*\_MLG$. The closed feedback loop 21 includes a summation module 21a which adds together the values within the vector of landing gear force commands, $F^*\_MLG$, to determine the representative scalar value. The longitudinal force overflow redistribution logic module 22 determines an error between the longitudinal force input demand, $Fx^*$, and the representative scalar value of the vector of landing gear force commands, $F^*\_MLG$, and uses that error to calculate a corrected longitudinal force input demand, $Fx\_R$.

The corrected longitudinal force input demand, $Fx\_R$, is received by a longitudinal force distributor module 24, which multiplies the corrected longitudinal force input demand, $Fx\_R$, by a plurality of force distribution parameters, one force distribution parameter for each MLG assembly. Each force distribution parameter determines the proportion of braking or driving force to be achieved by its respective MLG assembly in order to achieve the corrected longitudinal force input demand, $Fx\_R$. The output of the longitudinal force distributor module 24 is thus a vector of distributed longitudinal force commands, $Fx\_Long$, each component of the vector representing a longitudinal braking or driving force command to be achieved by each MLG assembly 11, 12 in order to achieve the corrected longitudinal force input demand, $Fx\_R$. The force distribution parameters are selected so that the longitudinal force command for each of the MLG assemblies (i.e. the braking or driving force to be achieved by those MLG assemblies) is the same. Thus, the longitudinal force distributor module 24 achieves symmetric distribution, so that the application of a longitudinal force command cannot result in a resultant yaw moment being applied to the aircraft.

The yaw moment input demand, $Mz^*$, is received by a moment overflow redistribution logic module 23, which is similar to the longitudinal force overflow redistribution logic module 22. The closed feedback loop 21 includes a moment conversion module 21b which converts the vector of landing gear force commands, $F^*\_MLG$, into a scalar value, $Mz$, representative of the yaw moment represented by that vector, and delivers that representative scalar value, $Mz$, to the moment overflow redistribution logic module 23. An error-based PI controller of the moment overflow redistribution logic module 23 determines an error between the received yaw moment input demand, $Mz^*$, and the scalar value, $Mz$, and uses that error to calculate a corrected yaw moment input demand, $Mz\_R$.

The corrected yaw moment input demand, $Mz\_R$, is received by a moment distributor module 25, which multiplies the corrected yaw moment input demand, $Mz\_R$, by a plurality of moment distribution parameters, one moment distribution parameter for each MLG assembly 11, 12. Each moment distribution parameter determines the proportion of longitudinal braking or driving force to be achieved by its respective MLG assembly in order to achieve the corrected moment input demand, $Mz\_R$. The output of the moment distributor module 25 is thus a vector of distributed moment commands. The vector is output to a force conversion module 25a, which converts each of the distributed moment commands into an equivalent longitudinal force command. The force conversion module 25a thus outputs a vector, $Fx\_Lat$, in which each component represents a longitudinal braking or driving force command to be achieved by each MLG assembly 11, 12 in order to achieve the corrected yaw moment input demand, $Mz\_R$.

The moment distribution parameters are selected so that the longitudinal force command for each of the MLG assemblies (i.e. the braking or driving force to be achieved by those MLG assemblies) has an equal magnitude but opposite direction. Thus, the moment distributor module 25 achieves an anti-symmetric distribution, so that there is no coupling between the longitudinal force commands and yaw moment commands. That is, the application of a yaw moment command cannot result in a resultant longitudinal force being applied to the aircraft.

The vectors $Fx\_Long$ and $Fx\_Lat$ from the longitudinal force distributor module 24 and moment distributor module 25, respectively, are received by a dynamic saturator 26, which applies a plurality of saturation limits to the longitudinal force commands. The saturation limits are runtime defined in accordance with data received from a reconfiguration module (not shown) which provides information concerning, for each MLG assembly 11, 12: the type(s) of actuator available; the operational status of that actuator; the health, i.e. fitness, of the actuator; runway conditions; operational scenarios; or any other structural, operational or system constraints. For example, the monitoring system may provide information indicating that an actuator of one of the MLG assemblies 11, 12 is operating sub-optimally or has experienced a failure mode, and the saturation limits may accordingly be runtime adjusted to ensure that that actuator is not overloaded.

The output of the dynamic saturator is the vector of landing gear longitudinal force commands, $F^*\_MLG$, which is generated from a combination of the vectors $Fx\_Long$ and $Fx\_Lat$.

The longitudinal force overflow redistribution logic module 22 and moment overflow redistribution logic module 23 each include runtime defined control gains which are used to calculate the corrected longitudinal force input demand, $Fx\_R$, and corrected yaw moment input demand, $Mz\_R$, respectively. The control gains are runtime defined in accordance with data received from the reconfiguration module, in the same way as for the saturation limits of the dynamic saturator 26 as discussed above. The control gains can thus be used to prioritise either the longitudinal force demand, $Fx^*$, or the yaw moment demand, $Mz^*$, depending on the particular operational situation at any one time. For example, in a situation in which the braking actuators of the MLG assemblies 11, 12 are required to work at 100% capacity to achieve the longitudinal force demand, it is not possible to achieve a further yaw moment demand by increasing the braking force applied to one of the MLG assemblies. In such a situation the control gains can be configured so as to reduce the braking force applied to one of the MLG assemblies below 100%, i.e. to prioritise the yaw moment demand at the expense of the longitudinal force demand.

The longitudinal force overflow redistribution logic module 22 and moment overflow redistribution logic module 23 thus internally redistribute the 'overflows' (i.e. the proportion of longitudinal braking or driving force that cannot be achieved by the MLG assemblies) in order to determine a combination of longitudinal force commands for the MLG assemblies that satisfies a predetermined priority (e.g. always achieve the yaw moment demand, even if this results in non-achievement of the longitudinal force demand, or vice versa). This can be referred to as optimally distributing the overflows.

The force and moment distribution parameters can also be runtime adjusted in accordance with data received from the reconfiguration module. Thus, for each MLG assembly 11, 12, runtime information concerning: the type(s) of actuator available; the operational status of that actuator; the health, i.e. fitness, of the actuator; runway conditions; operational scenarios; or any other structural, operational or system constraints, can be used to determine in what proportion the longitudinal force input demand, Fx*, and moment input demand, Mz*, should be distributed between the MLG assemblies.

Although the invention has been described above with reference to one or more preferred embodiments, it will be appreciated that various changes or modifications may be made without departing from the scope of the invention as defined in the appended claims.

The invention claimed is:

1. A landing gear force and moment distributor system for an aircraft having a longitudinal axis aligned in a forward-aft direction, a vertical axis perpendicular to the longitudinal axis, and a landing gear including a pair of main landing gears arranged symmetrically about the longitudinal axis, each main landing gear having an actuator arranged to brake and/or drive one or more wheels of the main landing gear, the force distribution system comprising:
   a distribution module arranged to:
      receive an input demand including a longitudinal force input demand corresponding to a desired braking or driving force along the longitudinal axis for the landing gear and a moment input demand corresponding to a desired moment about the vertical axis for the landing gear; and
      to use the received input demand to calculate an output command comprising, for each main landing gear, a longitudinal force output command corresponding to a braking or driving force along the longitudinal axis to be applied to said main landing gear to achieve the longitudinal force input demand, and a moment output command corresponding to a braking or driving force along the longitudinal axis to be applied to said main landing gear to achieve the moment input demand; and
   an error-based feedback loop module arranged to:
      calculate an error difference between the output command and the input demand;
      use the calculated error difference to calculate a corrected longitudinal force demand and corrected moment demand; and
      output the corrected longitudinal force input demand and corrected moment input demand to the distribution module to be received as the longitudinal force input demand and moment input demand, respectively, of the input demand.

2. The system according to claim 1, wherein the error-based feedback loop module includes:
   a first closed feedback loop arranged to calculate a first error difference between a sum of the plurality of longitudinal force output commands and the longitudinal force input demand; and
   a second closed feedback loop arranged to calculate a second error difference between a sum of the plurality of moment output commands and the moment input demand, and
   the error-based feedback loop module is arranged to use the first error difference to calculate the corrected force input demand and to use the second error difference to calculate the corrected moment input demand.

3. The system according to claim 1 or claim 2, wherein the distribution module is arranged to calculate the output command such that the longitudinal force output command for each of the pair of main landing gear is the same.

4. The system according to claim 1 or claim 2, wherein the distribution module is arranged to calculate the output command such that the moment output command for one of the pair of main landing gear is equal in magnitude but opposite in direction to that of the other of the pair of main landing gear.

5. The system according to claim 1 or claim 2, wherein the distribution module is arranged to calculate the output command by multiplying the received input command by a plurality of distribution parameters, each distribution parameter corresponding to a characteristic of the actuator of one of the pair of main landing gear.

6. The control system according to claim 5, wherein the distribution parameters can be runtime adjusted according to one or more of: operational scenarios, system layout, structural constraints, actuator type, actuator fitness and actuator availability.

7. The system according to claim 2, wherein the error-based feedback loop module is arranged to apply a first control gain to the first error difference to calculate the corrected force input demand, and to apply a second control gain to the second error difference to calculate the corrected moment input demand.

8. The system according to claim 7, wherein the first and second control gains can be runtime adjusted in accordance with one or more of: operational scenarios, system layout, structural constraints, actuator type, actuator fitness and actuator availability.

9. The system according to claim 7 or claim 8, wherein the first and second control gains can be runtime adjusted to priorities either the longitudinal force input demand or the moment input demand.

10. The system according to claim 1, including a priority saturation module arranged to:
   receive the longitudinal force input demand and moment input demand;
   limit either the longitudinal force input demand or the moment input demand according to one or more runtime adjusted priority saturation values; and
   output the longitudinal force input demand and moment input demand to the distribution module.

11. The system according to claim 10, wherein the priority saturation values are tuned in accordance with one or more of: operational scenarios, system layout, structural constraints, actuator type, actuator fitness and actuator availability.

12. The system according to claim 1, including a dynamic saturation module arranged to:

receive the output command from the distribution module;
receive a plurality of runtime adjusted dynamic saturation values; and
limit the output command according to the dynamic saturation values.

13. The system according to claim 12, wherein each of the dynamic saturation values is dependent on one or more of: operational scenarios, system layout, structural constraints, actuator type, actuator fitness and actuator availability.

14. The system according to claim 10, including a dynamic saturation module arranged to:
receive the output command from the distribution module;
receive a plurality of runtime adjusted dynamic saturation values; and
limit the output command according to the dynamic saturation values, and wherein the priority saturation module is arranged to optimally redistribute a portion of each of the received longitudinal force input demand and the moment input demand that exceeds the dynamic saturation values.

15. The system according to claim 1, comprising a reconfiguration module arranged to receive reconfiguration parameters indicative of one or more of:
an operational scenario, system layout, structural constraints, actuator type, actuator fitness, and actuator availability, and to output priority saturation values, dynamic saturation values, first and second control gains and/or distribution parameters based on those reconfiguration parameters in the event of a change in said one or more parameters, without disrupting its continuous operation.

* * * * *